Patented Sept. 3, 1935

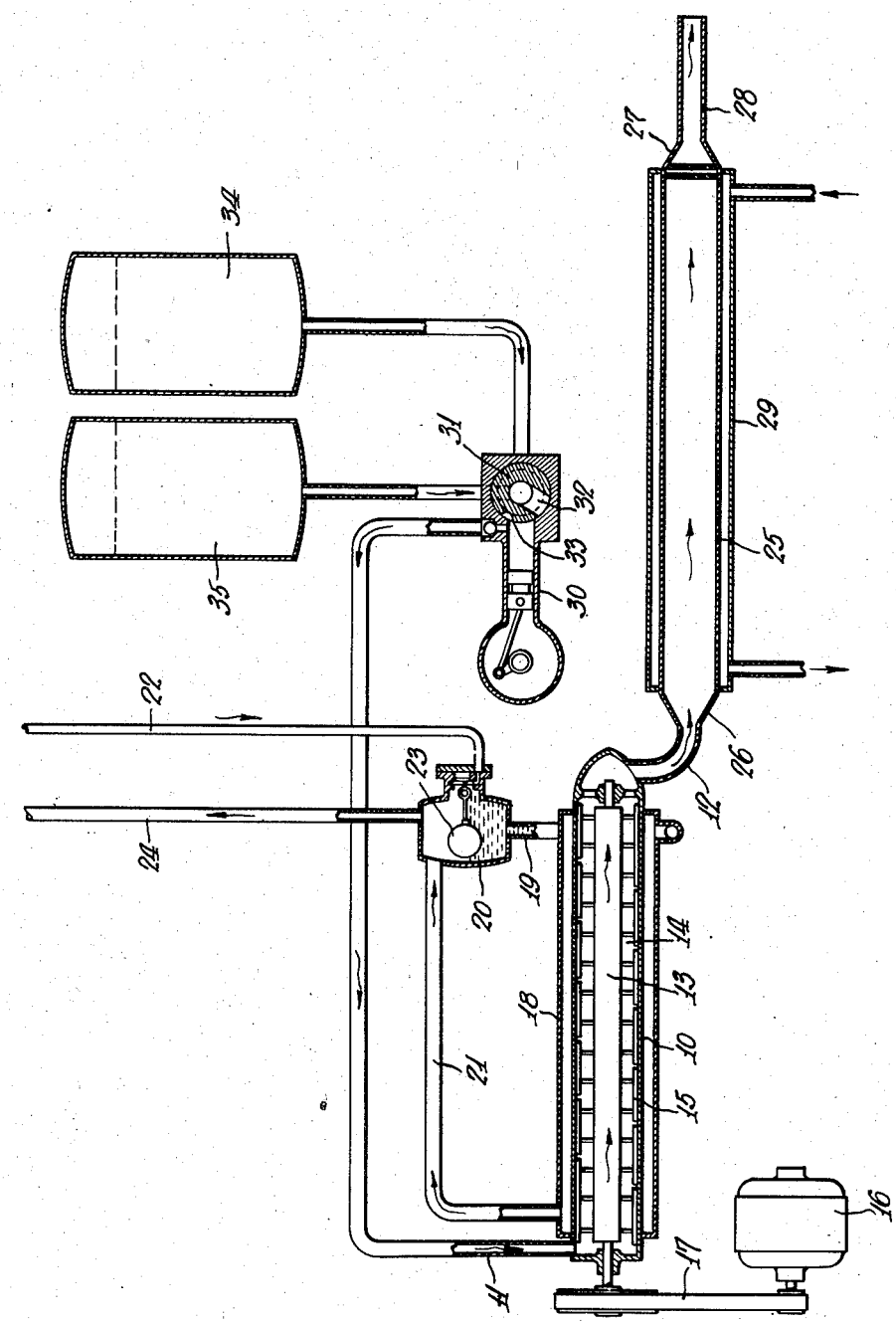

2,013,025

UNITED STATES PATENT OFFICE 2,013,025

PROCESS OF SOLIDIFYING MATERIAL

Robert Roger Bottoms and William Roberts Wood, Louisville, Ky., assignors to The Girdler Corporation, Louisville, Ky., a corporation of Delaware Application April 26, 1934, Serial No. 722,517

7 Claims. (Cl. 62—173)

This invention relates to the solidification of liquids by the abstraction of heat from such liquids to convert them from liquid form to solid form or to a condition in which they are sufficiently solid to be form retaining. Among the non-culinary materials which require such treatment in their preparation are paraffines, soaps and waxes, either alone or as mechanical mixtures or chemical compounds with other ingredients and having a definite melting point or different melting points within a limited range for different ingredients.

Among the commercial culinary products which require such treatment are oils, fats, lard, lard compounds, shortenings, vegetable oil compounds, margarine, greases, etc. Such materials are usually in a liquid state at some stage in the preparation, but are used commercially in solid or semi-solid form. They may or may not contain some water or other liquid having a solidifying temperature below that of the product as a whole. The main objects are to improve the crystalline structure of the product, and to effect substantial economy in the cooling time, the equipment required for cooling and working, and the space occupied by the cooling apparatus.

As the main novel feature of the invention the liquid, at a temperature above that at which it sets or solidifies, is rapidly cooled to a temperature substantially below the temperature at which the material sets or solidifies, and under conditions which prevent it from solidifying during the cooling. The material is then brought to a quiescent state and permitted to set or solidify. The supercooling is under such conditions that the material remains as a liquid as the end of the cooling operation.

By the term "liquid" is not meant merely such condition as will permit the material to flow under pressure, but is meant a condition in which the material will instantly or rapidly seek its own level in a container.

By the term "supercooling" is meant the abstraction or removal of heat to such an extent that the liquid, when brought to a quiescent state, will set or solidify without further cooling or abstraction of any further heat. The extent to which the temperature is lowered below the normal solidifying temperature will obviously depend upon the latent heat of fusion of the material.

The supercooling is effected while the liquid is in rapid motion and the refrigerant employed is one of such temperature and employed in such quantity as will cause the very rapid lowering of the temperature of the liquid while in such rapid motion.

By reason of the extremely rapid supercooling of the liquid by a refrigerant having a temperature very much below that at which the material solidifies, the crystalline structure or texture is greatly improved. Also there is required only a comparatively small cooling apparatus through which the liquid is continuously passed. The supercooled liquid may be delivered directly to containers in which it will set or solidify to the desired form without the necessity for further cooling. Thus there is effected an improvement in the character of the product, a substantial economy in the cooling time, less space is required for the cooling apparatus, and the amount of equipment required.

After the supercooled liquid has been brought to a quiescent state it may be permitted to set or solidify partly or completely and may then be worked at whatever degree of solidity is necessary to give it the desired texture and smoothness. It may be extruded as a bar or rod of the desired cross-sectional form, utilizing for this purpose the pressure employed in forcing the liquid through the supercooling apparatus.

The material may be agitated during the supercooling solely for the purpose of speeding the cooling action and maintaining such motion of the liquid as will prevent the setting during the supercooling, or the agitating may also serve to effect thorough and homogeneous mixing of two or more ingredients delivered to the supercooler.

The emulsifying and agitation may be advantageously effected simultaneously with the supercooling in the preparation of products, such as margarine, vegetable oil compounds etc., which are made up of a plurality of ingredients mixed in predetermined relative proportions.

Merely as an example of an apparatus which may be employed for carrying out the process, reference is had to the accompanying drawing in which the single figure shows a somewhat diagrammatic longitudinal section of the various parts of such apparatus and their connections.

In the drawing the apparatus permits the combining of the emulsifying with the simultaneous agitating and supercooling, and includes a tube 10 having an inlet conduit 11 at one end and an outlet conduit 12 at the opposite end. Within the tube is a comparatively large shaft 13 spaced from the wall of the tube to leave a comparatively thin annular space or passage 14 for the liquid to be treated. The shaft carries a plurality of scrapers 15 which engage or substantially engage the inner surface of the tube and the scrapers in combination with their connections to the shaft, constituting mechanical whipping, beating or agitating means.

The shaft may be rotated in any suitable manner, as for instance by an electric motor 16, and belt drive 17, and the exterior of the tube is cooled by a refrigerant which will extract the heat and lower the temperature very rapidly. The refrigerant may be circulated through or delivered to a jacket 18 encircling the tube and of substantially the same length as the tube. If liquid ammonia constitutes the refrigerant it may be delivered to the end of the jacket nearest to the outlet 12 through a supply pipe 19 from a receiver 20, and the opposite end of the jacket may be connected to the upper part of the receiver by a gas return pipe 21, and any liquid which is carried along by the gas in the pipe 21 will be separated in the receiver 20. The liquid may be supplied to the receiver 20 through a conduit 22 and may be kept at a substantially constant level within the receiver by a valve controlled by an ordinary float 23. The gas may return from the receiver 20 to the refrigerating system through a gas return pipe 24.

This apparatus which may be employed to effect the supercooling may be substantially the same as that shown in the various Vogt patents, Nos. 1,783,864, 1,783,865, 1,783,866, 1,783,867, 1,847,149, and 1,940,473.

The thickness of the annular space 14 may be a small fraction of an inch, and the liquid may be delivered through this space in close contact with the refrigerating jacket at a comparatively high speed, so that the flow through the annular space from one end to the other and the entire supercooling action may take only a few seconds. This is due to the extremely low temperature of the refrigerant and the thinness of the annular layer of material subjected to the action of the refrigerant. The thickness of the annular space, the rapidity of the flow, and the kind and temperature of the refrigerant may be varied for different materials.

Due to the agitation and rapid motion of the liquid it is kept in liquid condition in spite of the fact that it is supercooled to a temperature substantially below that at which it would normally set or solidify. The supercooled liquid delivered through the outlet 12 is conducted to a receiver in which it may come substantially to rest or be brought to a substantially quiescent state, but may move bodily without substantial agitation or may be treated in any other desired manner. There may be a series of such receivers or receptacles filled in succession from the outlet 12, particularly if there is no need for further working or homogenizing the set or solidified product.

The chilling and supercooling in this apparatus is conducted under such conditions that the refrigerant does not come into direct contact with the material and there is no loss or addition of ingredients during the processing which is carried out in a closed system.

Where there is need for working the solidified product to render it more homogeneous, the receiver may be in the form of a tube 25 of very much larger cross-sectional area than the outlet 12, and connected directly to the latter, for instance through a funnel shaped end portion 26 of the receiver. The tube is completely filled with the material which sets or solidifies due to its supercooled condition when the agitation or rapid movement of the material ceases and it becomes substantially quiescent. The material sets or hardens in the tube and is bodily advanced along the tube in a substantially quiescent state to the delivery end. Here there may be provided one or more screens or perforated plates through which the solid material is forced into an outlet funnel 27 where the separate streams passing through one or more screens or perforated plates are brought together and delivered through a small tube 28, which may act as an extrusion die and deliver a bar or rod of the solidified material of any desired cross-sectional area. The rod or bar may pass to an endless conveyer and through any desired cutting and packaging mechanism. As an example there may be two screens, one having about forty mesh to the inch and the second having about sixty mesh to the inch, if the material be certain types of margarine.

As previously emphasized, there is no necessity for removing any further heat from the material during the solidification. If there be any tendency of the material to adhere to the wall of the tube or receiver 25, the latter may be warmed slightly to facilitate the sliding of the material along the polished or smooth inner surface. For that purpose there is illustrated a jacket 29 through which warm water may be circulated if desired.

If the supercooling and agitating apparatus be employed for delivering to a series of receptacles in succession, it may be mounted with a vertical axis, and the liquid may pass through from an overhead receiver solely by the action of gravity and the liquid head.

If the material is to be worked or homogenized and extruded, then a greater pressure will ordinarily be needed to effect the desired rapidity of motion through the supercooler, and the forcing of the heavier material through the homogenizer and die. For this purpose any suitable form of pump connected to the inlet may be employed.

If the supercooler is to serve as an emulsifier or mixer of ingredients as well as a supercooler and agitator, the pump may be designed to deliver separate liquids in predetermined relative proportions. Merely as an example there is illustrated a reciprocating pump 30 having a valve controlled outlet connected to the inlet pipe 11 of the supercooler, and having a valve 31 controlling the inlet. This valve may have independent passages 32 and 33 separately connected to two supply vessels 34 and 35. The valve may be geared to the crank shaft of the pump so that during the suction stroke of the pump piston, first one passage 32 and then the other passage 33 will come into registry with the cylinder and liquid will be sucked into the cylinder first from one vessel and then from the other. At the end of the suction stroke of the piston the valve will reach such a position that both of the passages 32 and 33 are out of registry with the cylinder, and during the delivery stroke the mixed liquids will be delivered through the pipe 11 to the supercooler. If the process be employed for margarine the vessel 34 may contain cultured milk and the vessel 35 may contain the mixture of oils.

By varying the sizes of the passages 32 and 33 and their relative positions and widths, the relative amounts of the two liquids which are sucked into the pump cylinder may be varied at will. By appropriate variation of the valve a larger number of liquids may be separately admitted in succession during the suction stroke.

Any other suitable form of proportioning pump may be employed where two or more fluids are to be supplied and one of which fluids may be air or other gaseous medium if desired. Other suitable mixing and proportioning means might be employed for delivering a mixture of two or more liquids or of liquids and a gas to an ordinary reciprocating or rotary pump.

The apparatus hereinabove described is only one form which may be employed for carrying out the process, and this may be varied in many particulars, depending upon the character of the material being processed. In some cases the rapid movement during supercooling may be effected by forcing the liquid at relatively high velocity through a countercurrent heat interchanger, the velocity causing the agitating and making unnecessary the use of a mechanical agitator such as that illustrated.

The setting or solidifying of the supercooled liquid may be due to crystallization, the union of minute crystals, or other action, and the liquid as delivered from the supercooler may contain varying amounts of fine crystals which have been formed due to the supercooling, but due to the rapidity of the cooling of the liquid in rapid motion the main body of the liquid is not crystallized or solidified, although cooled to a temperature below that at which it would normally crystallize or set. The extent of the supercooling in respect to the portion of the liquid which is not solidfied in the supercooler is such that substantially the entire body may crystallize, set or otherwise solidify when brought to a quiescent state and without the abstraction of any further heat.

Having thus described our invention, what we claim as new and desire to secure by Letters Patent is:

1. A process for solidifying soaps, waxes and other non-culinary material from a liquid condition, which includes the step of supercooling the liquid to a temperature substantially below its normal solidifying point, while maintaining it in motion in liquid condition, the amount of heat abstracted during such supercooling being sufficient to permit the liquid to solidify without abstraction of further heat when brought to a substantially quiescent state.

2. A process for solidifying soaps, waxes and other non-culinary material from a liquid condition, which includes the steps of supercooling the liquid to a temperature substantially below its normal solidifying point, while maintaining it in motion in liquid condition, and delivering the supercooled liquid in a condition of such fluidity that it will seek its own level in a receiver.

3. A process for treating mixtures of non-culinary materials having different melting points, one or more of the ingredients of such mixture being normally solid at ordinary room temperature, said process including the supercooling of the material in liquid condition to a temperature substantially below the melting point of said normally solid constituent while maintaining the mixture in a liquid condition such that it will seek its own level in a receiver.

4. A process of treating soaps, waxes or other non-culinary material normally solid at ordinary room temperature and readily liquefiable at a higher temperature, said process including delivering the liquid as a stream, rapidly agitating the liquid and supercooling it in said stream, the supercooling and agitating being to such an extent that the material remains in liquid form during the abstraction of all of the heat required to permit the solidifying of the liquid when brought to rest.

5. A process of treating soaps, waxes or other non-culinary material normally solid at ordinary room temperature and readily liquefiable at a higher temperature, said process including delivering the liquid as a stream, rapidly agitating the liquid and supercooling it in said stream, the supercooling and agitating being to such an extent that the material remains in liquid form during the abstraction of all of the heat required to permit the solidifying of the liquid, and permitting said supercooled liquid to set while in a quiescent condition.

6. The process of treating a material normally solid at ordinary room temperature and readily liquefiable, which includes forcing the liquefied material under pressure at high velocity through a thin confined space, agitating the material in said space and simultaneously supercooling it, delivering the supercooled liquid from said space to a tubular receiver where it may solidify in a quiescent condition without further abstraction of heat, and utilizing the pressure required for forcing the liquid through said space for forcing the solidified material from said receiver as a solid bar.

7. The process of treating a material normally solid at ordinary room temperature and readily liquefiable, which includes forcing the liquefied material under pressure at high velocity through a thin confined space, agitating the material in said space and simultaneously supercooling it, delivering the supercooled liquid from said space to a tubular receiver where it may solidify in a quiescent condition without further abstraction of heat, utilizing the pressure required for forcing the liquid through said space for forcing the solidified material from said receiver as a solid bar, and homogenizing the solid material within but adjacent to the delivery end of said tubular receiver.

ROBERT ROGER BOTTOMS.
WILLIAM ROBERTS WOOD.